J. A. RATCLIFF.
INSECT DESTROYER.
APPLICATION FILED MAR. 26, 1920.
1,370,496.
Patented Mar. 1, 1921.
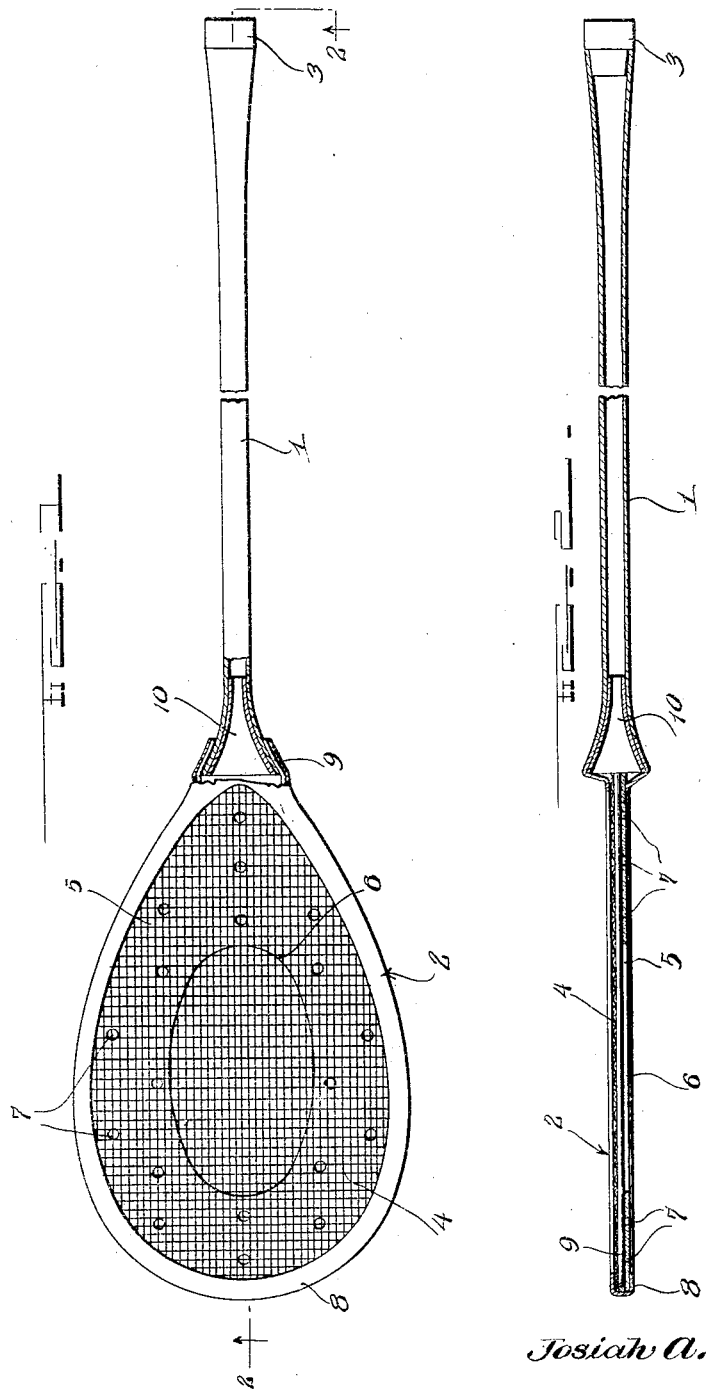
Josiah A. Ratcliff
INVENTOR
BY Victor J. Evans
ATTORNEY

UNITED STATES PATENT OFFICE.

JOSIAH A. RATCLIFF, OF ALEXANDRIA, INDIANA.

INSECT-DESTROYER.

1,370,496. Specification of Letters Patent. Patented Mar. 1, 1921.

Application filed March 26, 1920. Serial No. 368,985.

*To all whom it may concern:*

Be it known that I, JOSIAH A. RATCLIFF, a citizen of the United States, residing at Alexandria, in the county of Madison and State of Indiana, have invented new and useful Improvements in Insect-Destroyers, of which the following is a specification.

This invention relates to a sanitary insect destroying device and the principal object of the invention is to provide a device made in the form of the well known "fly swatter" and provided with means for picking up the fly after being killed or stunned.

Another object is to provide the device with a hollow handle for receiving the flies and having means therein for preventing the flies that have been stunned from crawling from out of the handle.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a view with parts broken away of the invention.

Fig. 2 is a section on line 2—2 of Fig. 1.

In the drawings, 1 indicates the handle of the device and 2 indicates the striking part. The handle is made hollow and its outer part made of greater diameter than its inner part and the outer end is closed by a stopper 3. The part 2 has one face formed of wire mesh 4 and its other face formed of a sheet 5 of thin but strong material such as celluloid. A large opening 6 is formed in the central part of this sheet and the sheet is also provided with perforations 7. This sheet is spaced from the wire mesh a sufficient distance to permit a fly or other insect to pass between the two parts and the two parts are secured together by the tape binding 8. These two parts may be secured to a wire frame 9, the ends of which are suitably secured to the handle. A cone-shaped member 10 is placed in the inner end of the handle with its wide mouth communicating with the space between the sheet and wire mesh and its open small end communicating with the hollow handle.

The device is used with the sheet side down and in striking the fly the device is so handled that the part of the wire screen uncovered by the opening in the sheet will strike the fly and the rebound of said wire screen will act to draw the fly into the space between the wire screen and the sheet and then by tilting the device the fly can be made to drop through the cone into the handle. When striking the fly on a table or horizontal surface the blow is struck with a sidewise motion so that the sheet will pass under the fly and then the device is tilted to cause the fly to pass into the handle. If the device should fail to pick up the fly it may be made to do so by placing the opening over the fly and then by a quick sharp movement to either side the fly will be picked up by the sheet. When the handle is full the stopper 3 may be removed and the flies dumped into a stove or any other place where they may be destroyed.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A device of the class described comprising a hollow handle, a frame connected with said handle, a wire screen covering one face of said frame, a perforated sheet covering the other face and spaced from the wire screen, said sheet having a central opening therein.

2. A device of the class described comprising a hollow handle, a frame carried thereby, a wire screen covering one face of the frame, a sheet of thin material covering the other face and having a large central opening therein, said sheet and screen being spaced apart and a conical member having its large end communicating with said space and its small end communicating with the handle.

In testimony whereof I affix my signature.

JOSIAH A. RATCLIFF.